3,542,803
N,N′-DIGYLCIDYL COMPOUNDS
Daniel Porret, Binningen, Switzerland, assignor to
Ciba Limited, Basel, Switzerland
No Drawing. Filed July 19, 1968, Ser. No. 745,978
Claims priority, application Switzerland, July 24, 1967,
10,502/67; Sept. 22, 1967, 13,327/67
Int. Cl. C07d 49/32
U.S. Cl. 260—309.5    9 Claims

ABSTRACT OF THE DISCLOSURE

New N,N′-diglycidyl compounds of formula

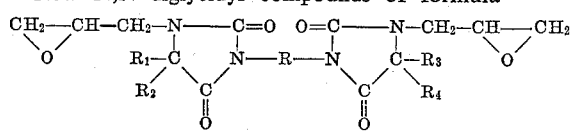

wherein R is an aliphatic, cycloaliphatic, or araliphatic residue and $R_1$, $R_2$, $R_3$ and $R_4$ each denote a hydrogen atom or an aliphatic or cycloaliphatic hydrocarbon residue, or wherein $R_1$ and $R_2$ and/or $R_3$ and $R_4$ together form a divalent aliphatic or cycloaliphatic hydrocarbon residue, preferably a tetramethylene or pentamethylene residue, said compounds react to the usual curing agents for epoxy compounds and, therefore, can be cross-linked or cured by the addition of such curing agents and can be used to prepare shaped articles such as castings, compression-moulded articles or laminates.

---

The subject of the present invention is new N,N′-diglycidyl compounds of formula

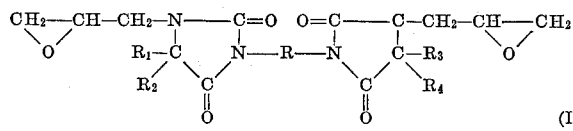

(I)

wherein R is an aliphatic, cycloaliphatic or araliphatic residue wherein $R_1$, $R_2$, $R_3$ and $R_4$ each denote a hydrogen atom or an aliphatic or cycloaliphatic hydrocarbon residue, or wherein $R_1$ and $R_2$ or $R_3$ and $R_4$ together form a divalent aliphatic or cycloaliphatic hydrocarbon residue, preferably a tetramethylene residue or a pentamethylene residue.

In the above Formula I the symbols $R_1$, $R_2$, $R_3$ and $R_4$ preferably denote lower alkyl residues having 1 to 4 carbon atoms, especially the methyl group.

The new diepoxides are manufactured according to methods which are in themselves known. The preferred procedure is to convert the resides X in a compound of formula

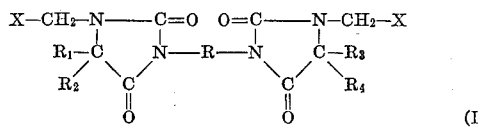

(II)

wherein R, $R_1$, $R_2$, $R_3$ and $R_4$ have the abovementioned significance and the residues X are residues which can be converted into 1,2-epoxyethyl residues, into epoxyethyl residues.

The residue X which can be converted into a 1,2-epoxyethyl residue is preferably a hydroxyhalogenethyl residue which carries the functional groups on different carbon atoms, especially a 2-halogen-1-hydroxyethyl residue. The halogen atoms are especially chlorine or bromine atoms. The reaction takes place in the usual manner, especially in the presence of reagents which split off hydrogen halide, such as strong alkalis, for example anhydrous sodium hydroxide or aqueous sodium hydroxide solution. It is however also possible to use other strongly alkaline reagents such as potassium hydroxide, barium hydroxide, calcium hydroxide, sodium carbonate or potassium carbonate.

A further residue X which can be converted into the 1,2-epoxyethyl residue is for example the ethenyl residue which can be converted to the 1,2-epoxyethyl residue in a known manner, such as by reaction with hydrogen peroxide or per-acids, for example peracetic acid, perbenzoic acid or phthalic mono-per-acid.

The starting substances of Formula II are obtained in a manner which is in itself known; for example a bishydantoin of formula

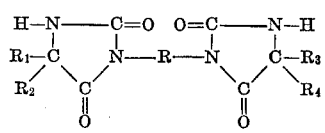

(III)

wherein R, $R_1$, $R_2$, $R_3$ and $R_4$ have the above-mentioned significances, can be reacted with a compound of formula X—$CH_2$—Hal, wherein Hal represents halogen atom and X has the above-mentioned significance. Preferably, the compound of Formula III is reacted with an epihalogenohydrin, especially epichlorhydrin, in the presence of a catalyst such as preferably a tertiary amine, a quaternary ammonium base or a quaternary ammonium salt.

Preferred catalysts for the addition of epichlorhydrin are tertiary amines, such as triethylamine, tri-n-propylamine, benzyldimethylamine, N-dimethylaniline and triethanolamine; quaternary ammonium bases such as benzyl-trimethylammonium hydroxide, quaternary ammonium salts such as tetramethylammonium chloride, benzyltrimethylammonium chloride, benzyltrimethylammonium acetate, and methyltriethylammonium chloride; hydrazines having a tertiary nitrogen atom such as 1,1-dimethylhydrazine, which may also be employed in a quaternised form; furthermore, ion exchange resins having tertiary or quaternary amono groups, as well as ion exchange resins having acid amide groups. Basic impurities which can occur in technical commercial forms of the starting compounds III can also act as catalyst. In such cases it is not necessary to add a special catalyst.

The invention also relates to those embodiments of the process in which one starts from a compound obtainable as an intermediate at any stage and carries out the remaining process stages, or in which a starting substance is formed under the reaction conditions or is further processed without isolation.

A preferred embodiment of the process for example consists of reacting an epihalogenohydrin, preferably epichlorhydrin, in the presence of a catalyst such as preferably a tertiary amine, a quaternary ammonium base or a quaternary ammonium salt, with a compound of Formula III and in a second stage treating the resulting product containing halogenohydrin groups with a reagent which splits off hydrogen halide. In these reactions the procedure described above is followed, and the above-mentioned compounds may be used as catalysts for the addition of epihalogenohydrin and for the dehydrohalogenation respectively. Particularly good yields are obtained if an excess of epichlorohydrin is used. During the first reaction, before the addition of alkali, a partial epoxidation of the dichlorohydrin of the hydantoin already takes place. The epichlorhydrin, which acts as a hydrogen chloride acceptor, is then partially converted into glycerine dichlorhydrin.

The starting compounds of Formula II may be easily obtained according to the process described in U.S.A.

patent specification 3,296,208, by condensation of 1 mol each of the two hydantoins of formulae

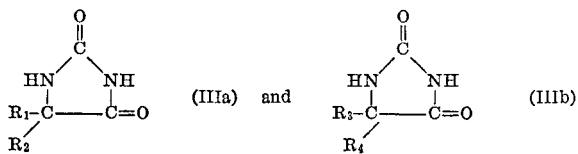

(IIIa and IIIb may be identical or different hydantoins) with 1 mol of a dihalide of formula <p align="center">Hal—R—Hal     (IV)</p> wherein Hal represents a halogen atom and R has the same significance as in Formula I in the presence of two equivalents of alkali.

The following may for example be mentioned as hydantoins of Formulae IIIa or IIIb; hydantoin, 5-methyl-hydantoin, 5-ethyl-hydantoin, 5-propyl-hydantoin, 1,3-diaza-spiro (4.4) nonane-2,4-dione, 1,3-diaza-spiro-(4.5) decane-2,4-dione, 5,5-diethyl-hydantoin, 5-methyl-5-ethyl-hydantoin and especially 5,5-dimethyl-hydantoin.

The following may be mentioned as dihalides of Formula IV: methylene chloride, 1,2-dichlorethane, 1,2- or 1,3-dichloropropane, 1,2- or 1,3- or 1,4- or 2,3-dichlorobutane, 1,2- or 1,3- or 1,4- or 1,5- or 2,3- or 2,4-dichloropentane, the corresponding dichlorohexanes, dichloroheptanes, dichloroctanes, dichlorononanes, dichlorodecanes, dichlorundecanes, dichlorododecanes, dichlorohexadecanes, dichlorooctadecanes, 1,4-dichloro-2-butene, di-2-chlorethylformal, di-2-chlorethyl ether, 1,4-dichloro-2-methylbutane, 1,3 - dichloro-2-hydroxypropane, 1,5-dichloro-2,2-dimethylpentane, di - (β-chlorethyl)-thioether, 1,2-, 1,3- or 1,4-dichlorodicyclohexane, 4,4′-dichlorodicyclohexylmethane, 4,4′ - dichlorodicyclohexyldimethylmethane, 1,2-, 1,3- or 1,4-dichloromethylbenzene, 1,4-diiodobutane, 1,5-dibromopentane, 1,4-dibromo-2-butene, 1,8-dibromoctane, α,α′-dibromo-o-, -m-, or -p-xylene, glycol-bis-chloracetate and the bis-monochloracetates of lower polyglycols.

The ω,ω′-bis-(5,5-dimethylhydantoinyl-3) derivatives of straight-chain hydrocarbons of the paraffin series are preferentially used as starting substances.

The diepoxides according to the invention of Formula I react with the usual curing agents for epoxide compounds. They can therefore be cross-linked or cured by the addition of such curing agents, analogously to other polyfunctional epoxide compounds. Possible curing agents of this type are basic or acid compounds.

The following have proved suitable: amines or amides, such as aliphatic and aromatic primary or secondary and tertiary amines, for example p-phenylenediamine, bis-(p-aminophenyl)-methane, ethylene diamine, N,N-diethyl-ethylene diamine, diethylene triamine, tetra-(hydroxyethyl)-diethylene triamine, triethylene tetramine, N,N-dimethylpropylene diamine, Mannich bases, such as 2,4,6-tris-(dimethylaminomethyl)-phenol; dicyandiamide, melamine and cyanuric acid; urea-formaldehyde resins and melamine-formaldehyde resins; polyamides, for example those made from aliphatic polyamines and dimerised or trimerised unsaturated fatty acids; polyhydric phenols, for example resorcinol, bis-(4-hydroxyphenyl)-dimethylmethane and phenol-formaldehyde resins; reaction products of aluminium alcoholates or phenolates with tautomerically reacting compounds of the type of acetoacetic-ester, Friedel-Crafts cacalysts, for example $AlCl_3$, $SbCl_4$, $ZnCl_2$, $BF_3$ and their complexes with organic compounds, such as for example $BF_3$-amine complexes; metal fluoborates such as zinc fluoborate; phosphoric acids; boroxines such as trimethoxyboroxine; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6 - endomethylene - $\Delta^4$ - tetrahydrophthalic anhydride (=methylnadicanhydride), 3,4,5,6,7,7 - hexachloro-3,6-endomethylene-$\Delta^4$-tetrahydrophthalic anhydride, succinic anhydride, adipic anhydride, maleic anhydride, allylsuccinic anhydride and dodecenylsuccinic anhydride; 7-allylbicyclo - (2.2.1) - hept-5-ene-2,3-dicarboxylic anhydride, pyromellitic dianhydride or mixtures of such anhydrides.

In the anhydride cure it is also possible optionally conjointly to use accelerators such as tertiary amines, their salts or quaternary ammonium compounds, for example 2,4,6-tris-(dimethylaminomethyl)-phenol, benzyldimethylamine or benzyldimethylammonium phenolate, $tin^{II}$ salts of carboxylic acids, such as $tin^{II}$ octoate or alkali metal alcoholates such as for example sodium hexylate.

In the cure of the polyepoxides according to the invention with anhydrides it is appropriate to use 0.5 to 1.1 gram equivalents of anhydride groups per 1 gram equivalent of epoxide groups.

The expression "cure" as used here denotes the conversion of the abovementioned diepoxides into insoluble and infusible cross-linked products, and this as a rule takes place with simultaneous shaping to give shaped articles such as castings, compression-moulded articles or laminates or two-dimensional structures such as lacquer films or adhesive bonds.

If desired, active diluents such as for example butylglycid, cresylglycid or 3-vinyl-2,4-dioxaspiro(5.5)-9,10-epoxyundecane can be added to the diepoxides according to the invention in order to lower the viscosity.

The diepoxides according to the invention can furthermore be used as mixtures with other curable diepoxide or polyepoxide compounds. As such there may for example be mentioned: polyglycidyl ethers of polyhydric alcohols or especially of polyhydric phenols, such as resorcinol, bis - (4-hydroxyphenyl)-dimethylmethane, (=bisphenol A), bis(4-hydroxyphenyl)-sulphone or condensation products of formaldehyde with phenols (novolacs); polyglycidyl esters of polycarboxylic acids such as for example phthalic acid diglycidyl ester of hexahydrophthalic acid diglycidyl ester; triglycidyl isocyanurate; aminopolyepoxides such as are obtained by dehydrohalogenation of the reaction products of epihalogenohydrin and primary or secondary amines such as aniline or 4,4′-diaminodiphenylmethane, as well as alicyclic compounds containing several epoxide groups such as vinylcyclohexene diepoxide, dicyclopentadiene diepoxide, ethylene glycol - bis(3,4-epoxytetrahydrodicyclopentadiene-8-yl) ether, 3,4-epoxytetrahydrodicyclopentadienyl - 8 - glycidyl ether, (3′,4′-epoxycyclohexylmethyl) - 3,4 - epoxycyclohexanecarboxylate, (3′,4′-epoxy-6′-methylcyclohexylmethyl)-3,4-epoxy-6 - methylcyclohexanecarboxylate, bis(cyclopentyl)ether diepoxide or 3-(3′,4′-epoxycyclohexyl)-2,4-dioxaspiro-(5, 5)-9,10-epoxyundecane.

The subject of the present invention are therefore also curable mixtures which are suitable for the manufacture of shaped articles including two-dimensional structures and which contain the diepoxides according to the invention, optionally together with other diepoxide or polyepoxide compounds and furthermore with curing agents for epoxide resins such as polyamines or polycarboxylic acid anhydrides.

The diepoxide compounds according to the invention, or their mixtures with other polyepoxide compounds and/or curing agents, may furthermore, before cure, be mixed at any stage with extenders, fillers and reinforcing agents, plasticisers, pigments, dyestuffs, flame-inhibiting substances or mould release agents.

Asphalt, bitumen, glass fibres, boron fibres, carbon fibres, cellulose, mica, quartz powder, hydrated aluminium oxide, gypsum, kaolin, ground dolomite, colloidal silicon dioxide of high specific surface area (Aerosil) or metal powders such as aluminium powder, can for example be used as extenders, fillers and reinforcing agents.

The curable mixtures may, in the unfilled or filled state, optionally in the form of solutions or emulsions, serve as laminating resins, paints, lacquers, dipping resins, impregnating resins, casting resins, compression-moulding compositions, sintering powders, spreading and trowelling compositions, floor covering compositions, potting and insulation compositions for electrotechnology, and adhesives, as well as for the manufacture of such products.

In the examples which follow the parts denote parts by weight and the percentages, percentages by weight:

EXAMPLES OF MANUFACTURE

Example 1

A mixture of 124 g. (0.4 mol) of 1,4-bis-(5',5'-dimethylhydantoinyl - 3') - butane, 1110 g. (30 mols) of epichlorhydrin and 0.4 g. of tetramethylammonium chloride was heated to boiling at 110° C. The epichlorhydrin adds to both NH groups with the formation, firstly of N-chlorhydrin groups and then of N-glycidyl groups with a part of the excess epichlorhydrin being converted into glycerine dichlorhydrin ("trans-epoxidation"). The formation of N-glycidyl groups during the reaction was followed by titration of samples after distilling off the unreacted epichlorhydrin and the dichlorhydrin formed during the trans-epoxidation. After 1½ hours the resin contained 1.2 epoxide equivalents/kg. and after 3½ hours 1.8 epoxide equivalents/kg.; the latter value corresponds to the trans-epoxidation equilibrium. The reaction mixture was cooled to 60° C. and thereafter 36.5 g. of 97% strength solid sodium hydroxide were added in portions over the course of 35 minutes. The temperature was kept at 60° C. by slight cooling. After addition of the sodium hydroxide the mixture was stirred for a further 30 minutes at 60° C. The reaction mixture was then concentrated in a vacuum of 35 mm. Hg until the entire quantity of the water of reaction had been distilled off azeotropically. Thereafter the sodium chloride which had formed was filtered off and washed with a little epichlorhydrin. The reaction product was then further concentrated, firstly at a vacuum of 30 mm. Hg in order to recover the excess epichlorhydrin and finally in a high vacuum. 162.5 (96.3% of theory) of a yellow resin were obtained which on cooling crystallised out. This product contained 4.70 epoxide equivalents/kg. and 1.35% of chlorine. On recrystallisation of 10 g. of this product with 20 g. of methanol 7 g. of a pure 1,4-bis(N-glycidyl - 5',5' - dimethyl-hydantoinyl-3')butane, which melts at 108–111° C. and is water-soluble to the extent of 3.4%, were obtained.

Analytical values.—Found (percent): Epoxide equivalents/kg. 4.71; C, 56.47; H, 7.19; N, 13.16. Calculated (percent): Epoxide equivalents/kg., 4.74; C, 56.86; H, 7.16; N, 13.26.

Example 2

A mixture of 187.6 g. of bis(5',5'-dimethylhydantoinyl-3') methane, 1942.5 g. of epichlorhydrin and 0.7 g. of tetramethylammonium chloride was heated to boiling. After 7 hours the hydantoin compounds had practically dissolved. Thereafter the mixture was cooled to 60° C. and 63.5 g. of 95% pure solid sodium hydroxide added in portions and the mixture worked-up as in Example 1. 266.5 g. of a crystalline mass which contained 4.78 epoxide equivalents/kg. and 3.8% of Cl were obtained.

After recrystallisation from methanol the pure compound of melting point 158–163° C. was obtained.

Example 3

A mixture of 98.7 g. of 1,2 - bis(5',5'-dimethylhydantoinyl-3')ethane (0.35 mol.) 971.25 g. of epichlorhydrin (10.5 mols) and 0.35 g. of tetramethylammonium chloride was heated to boiling to 115–119° C. After 3 hours the solution became practically clear and a resin sample contained 2.1 epoxide equivalents/kg. After 3½ hours the solution was cooled to 60° C. and 90.8 g. of 97% strength sodium hydroxide (2.2 mols) were added in portions. Working-up was carried out according to Example 1 and 133 g. of 1,2 - bis-(N-glycidyl-5',5'-dimethylhydantoinyl-3') ethane were obtained as a brown highly viscous resin (98.8%) having an epoxide content of 5.08 epoxide equivalents/kg. and a chlorine content of 2.6%.

Example 4

338 g. of 1,6-bis(5',5'-dimethylhydantoinyl-3')-hexane (1 mol), 2775 g. of epichlorhydrin (30 mols) and 0.8 g. of tetramethylammonium chloride were mixed and heated to 117° C. for 6 hours. A resin sample contained 1.55 epoxide equivalents/kg. 90.8 g. of 97% strength sodium hydroxide (2.2 mols) were added in portions to the mixture cooled to 60° C. and working-up was then effected according to Example 1. 449 g. of a yellow resin which is solid at room temperature (corresponding to 99.8% yield), having an epoxide content of 4.22 epoxide equivalents/kg. and a chlorine content of 2.18%, were obtained.

The 1,6-bis(N-glycidyl-5',5' - dimethylhydantoinyl-3') hexane recrystallised from methanol contained 4.49 epoxide equivalents/kg.; it melts at 107–109° C. and is 0.22% soluble in water at 20° C.

Elementary analysis gave the following values;
Found (percent): C, 58.55; H, 7.81; N, 12.42. Calculated (percent): C, 58.65; H, 7.61; N, 12.44.

Example 5

A mixture of 211 g. of 1,12-bis(5',5'-dimethylhydantoinyl-3')-dodecane (0.5 mol), 1387.5 g. of epichlorhydrin (15 mols) and 0.5 g. of tetramethylammonium chloride was heated to 117° C. for 5 hours. A resin samplt contained 1.3 epoxide equivalents/kg. 45.36 g. of 97% strength sodium hydroxide were added in portions to the solution cooled to 60° C. and the batch was worked-up as in Example 1. 266 g. of 1,12-bis-(N-glycidyl-5',5'-dimethyl-hydantoinyl-3)-dodecane (99.5% of theory) were obtained. The light brown viscous resin contained 1.0% of chlorine and 3.86 epoxide equivalents/kg. and had a viscosity of 12.000 cp. at 20° C.

Example 6

260 g. of β,β'-bis(5',5'-dimethyl-hydantoinyl-3')-diethyl ether (0.8 mol), 2220 g. of epichlorhydrin (24 mols) and 0.8 g. of tetramethylammonium chloride were mixed whilst stirring and heated to 117° C. for 3 hours. The resin sample thereafter contained 1.72 epoxide equivalents/kg. 72.3 g. of 97% pure sodium hydroxide (1.76 mols) were added in portions, over the course of 30 minutes, to the mixture cooled to 60° C. The batch was then worked-up in accordance with Example 1. 342.5 g. (corresponding to 97.7% of theory) of a very viscous resin having an epoxide content of 4.54 epoxide equivalents/kg. (theory: 4.57), a chlorine content of 2.37% and a viscosity of 128,300 cp. at 20° C. were obtained.

The resulting diglycidyl ether of β,β'-bis(5',5'-dimethylhydantoinyl-3')diethyl ether was water-soluble.

Example 7

A mixture of 36.2 g. of 1,4-bis-(5',5'-pentamethylene-hydantoinyl-3')butane[3,3' - tetramethylene - bis(1,3-diazaspiro[4,5]decane-2,4-dione)], 277.5 g. of epichlorhydrin and 0.1 g. of tetramethylammonium chloride was heated to boiling. After 3 hours the hydantoin compound had practically dissolved. After 5 hours 40 minutes, 0.1 g. of tetramethylammonium chloride were added. A resin sample contained 1.79 epoxide equivalents/kg. after 7½ hours. After 8½ hours the solution was cooled to 70° C.

and 8.6 g. of 98% strength sodium hydroxide were added in portions. The mixture was then worked-up in accordance with Example 1. 47.3 g. of 1,4-bis(N-glycidyl-5′,5′-pentamethylenehydantoinyl-3′)butane[3,3′ - tetramethylene - bis(1,3-diaza-spiro[4,5]decane - 1 - glycidyl - 2,4-dione)] were obtained as a crystalline mass which contained 4.14 epoxide equivalents/kg. and 1.96% of chlorine.

After recrystallisation from 95% strength ethyl alcohol the pure compound having a melting point of 131–133° C. was obtained.

Example 8

A mixture of 16.9 g. of 1,4-bis(5′-n-propyl-hydantoinyl-3′)butane, 138.8 g. of epichlorhydrin and 0.05 g. of tetramethylammonium chloride was heated to boiling, whereupon practically all the material had dissolved after 15 minutes. After 4 hours 0.05 g. of tetramethylammonium chloride were added. A resin sample contained 1.47 epoxide equivalents/kg. after 6 hours 30 minutes. After 7 hours 15 minutes the mixture was cooled to 60° C. and 4.3 g. of 98% strength sodium hydroxide were introduced in portions. The mixture was then worked-up in accordance with Example 1. 20.8 g. of 1,4-bis (N-glycidyl-5′-n-propyl-hydantoinyl-3′)butane were obtained as a highly viscous mass which contained 4.43 epoxide equivalents/kg. and 196% of chlorine.

USE EXAMPLES

Example I 100 parts of the 1,12-bis(N-glycidyl-5′,5′-dimethylhydantoinyl-3)dodecane described in Example 5, which is liquid at room temperature, were mixed with 9 parts of triethylene tetramine. The resin-curing agent mixture had a pot life of 3000 cp. of 40 minutes at 40° C.

The resin-curing agent mixture was cast into prewarmed aluminium moulds (4 mm. thick sheets for mechanical measurements) and cured for 24 hours at 40° C. and then for 6 hours at 100° C. to give castings.

The castings had the following properties:

Flexural strength according to VSM 77,103: 6.5 kg./mm.$^2$, no fracture on maximum deflection,
Deflection according to VSM 77,103 impact strength: 20 mm.,
According to VSM 77,105 heat distortion point: 23.4 cmkg./cm.$^2$,
According to Martens (DIN): 34° C.

Additionally, aluminium strips (registered tradename "Anticorrodal") were lap-glued with the resin-curing agent mixture, with an overlap of 10 mm. (cure: 24 hours at 40° C.+6 hours at 100° C.). A tensile shear strength of 1.5 kg./mm.$^2$ was measured.

EXAMPLE II

Three hot-curing casting resin mixtures were manufactured by mixing hexahydrophthalic acid anhydride with 1,2-bis(N-glycidyl-5′,5′-dimethyl - hydantoinyl-3′)-ethane according to Example 3 (=epoxide resin A), 1,6-bis (N-glycidyl - 5′,5 - dimethyl hydanotinyl-3′)-hexane according to Example 4 (=epoxide resin B) and 1,12-bis (N - glycidyl - 5′,5′ - dimethylhydantoinyl - 3′)-dodecane according to Example 5 (=epoxide resin C), in the quantity ratios shown in the table which follows. For comparison, a known casting resin mixture was manufactured by mixing hexahydrophthalic anhydride with a liquid bisphenol-A-glycidyl ether manufactured by condensation of epichlorhydrin with 2,2-bis(p-hydroxyphenyl)-propane in the presence of alkali, which is liquid at room temperature and has an epoxide content of 5.3 epoxide equivalents/kg. (=epoxide resin D). The mixtures were manufactured by dissolving the anhydride curing agent in the fused resin.

In order to compare the reactivities of the resin/curing agent mixtures, the gelling times were determined at different temperatures on the Kofler bench:

| Sample No.: | 1 | 2 | 3 | 4 |
|---|---|---|---|---|
| Epoxide resin A, parts | 100 | | | |
| Epoxide resin B, parts | | 100 | | |
| Epoxide resin C, parts | | | 100 | |
| Epoxide resin D, parts | | | | 100 |
| Hexahydrophthalic anhydride, parts | 66.8 | 55 | 8.2 | 68.7 |
| Gel time at— | | | | 4 |
| 140° C | 9′10″ | 11′10″ | 12′ | >3′ |
| 120° C | 24′ | 29′ | 44′ | |
| 100° C | 60′ | 72′ | 140′ | |

The experimental results show that the new N,N′-diglycidylhydantoin derivatives A, B and C react significantly more rapidly than the conventional epoxide resin D based on bisphenol A. When using the new products the use of an accelerator can therefore be dispensed with. The short gel time of a two-component system is then an advantage if for example smaller structural units (rotors, stators, solenoids or condensers) are to be impregnated, potted or encapsulated in larger numbers.

Castings were manufactured from casting resin samples 1, 2, 3 and 4 by casting into pre-warmed aluminium moulds (4 mm. thick sheets for mechanic measurements) and curing under the curing conditions given in the table which follows.

The pot life of the casting resin samples at 80° and 120° C. as well as the properties of the castings manufactured therefrom may be seen from this table.

| Sample No.: | 1 | 2 | 3 | 4 |
|---|---|---|---|---|
| Epoxide resin A | 100 | | | |
| Epoxide resin B | | 100 | | |
| Epoxide resin C | | | 100 | |
| Epoxide resin D | | | | 100 |
| Hexahydrophthalic anhydride | 66.8 | 55 | 48.2 | 68.7 |
| Pot life at 80° C. to 1,500 cp | 2′16″ | 2′14″ | 3′33″ | 76′ |
| Pot life at 120° C. to 1,500 cp | 12′ | 14′ | 30′ | 7′ 18″ |
| Cure conditions | 16 hrs./80° C. + 12 hrs./120° C. | | | |
| Flexural strength kg./mm.$^2$ | 9.6 | 13.0 | 9.4 | 5.5 |
| Deflection, mm | 3.2 | 9.7 | 14.4 | 2.7 |
| Impact strength, cmkg./cm.$^2$ | 7.9 | 16.85 | 14.7 | 3.3 |
| Heat distortion point according to Martens (DIN) | 121 | 92 | 62 | 50 |
| Water absorption (4 days at room temperature), percent | 0.48 | 0.57 | 0.35 | 0.21 |

In the case of the three N,N′-diglycidyl-hydantoin derivatives the increase in flexibility as a result of an enlargement of the distances between the reacting groups can be very easily followed by the increase in impact strength and deflection values. The increased reactivity not only has an effect on the pot life of the resin-curing agent mixture at elevated temperatures but also on the properties of the cured shaped article. Whilst the mixture of the known epoxide resin D and hexahydrophthalic anhydride, without accelerator, is still heavily undercured after 16 hours at 80° C. and 12 hours at 120° C., the N,N′-diglycidyl-hydantoin derivatives show good mechanical values.

Example III 347 g. of $\beta,\beta'$-(1′-glycidyl-5′-dimethyl-hydantoinyl-3′) diethyl ether (manufactured according to Example 6), 82 g. of bis-(4-amino-3-methylcyclohexyl)-methane, 14 g. of zinc stearate, 14 g. of carnauba wax, 246 g. of calcined kaolin (registered tradename "Molochit"), 753 g. of aluminium oxide trihydrate and 42 g. of red iron oxide were kneaded for about 30 minutes in a divided trough kneader to give a homogeneous mixture. Thereafter the kneaded material was stored for about 24 hours at room temperature. The mass became solid during this time and could be comminuted into coarse pieces.

The compression moulded composition thus obtained was compression moulded for 4 minutes at 150° C. and at 200 kg./cm.$^2$ pressure.

The compression mouldings obtained had the following properties:

Dissipation factor tg $\delta$ (50 cycles/second, 25° C.—345×10$^{-2}$.

Volume resistance, dry—$4.1 \times 10^{14}$.
Surface resistance, dry—$10^{13}$ ohm.
Arc resistance DIN 53484 (level)—L 4.
Flexural strength according to VSM 77,103—3.6 kg./mm.$^2$.

I claim:
1. A N,N'-diglycidyl compound of formula

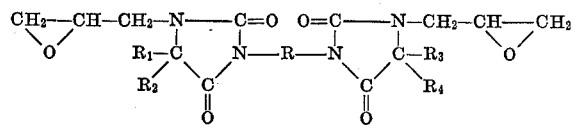

wherein R is a member selected from the group consisting of saturated and ethylenically unsaturated aliphatic hydrocarbon of up to 18 carbon atoms;
—CH$_2$—CH$_2$—O—CH$_2$—CH$_2$—
—CH$_2$—CH$_2$—S—CH$_2$—CH$_2$—

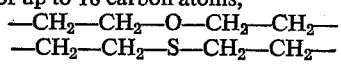

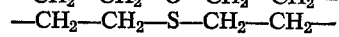

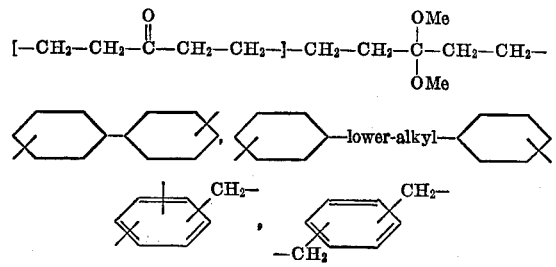

—CH$_2$—COO—CH$_2$—CH$_2$—OOCCH$_2$—
—CH$_2$—COO—lower polyglycolyl—OOC—CH$_2$— and $$-CH_2-\underset{\underset{OH}{|}}{CH}-CH_2-$$

R$_1$, R$_2$, R$_3$ and R$_4$ each are members selected from the group consisting of hydrogen and lower alkyl and together each of R$_1$, R$_2$, and R$_3$, R$_4$ form a member selected from the group consisting of divalent tetramethylene and pentamethylene.

2. Bis(N-glycidyl-5,5-dimethylhydantoinyl-3)methane.
3. 1,4 - bis(N - glycidyl-5',5'-dimethylhydantoinyl-3')-butane.
4. 1,2 - bis(N - glycidyl-5',5'-dimethylhydantoinyl-3')-ethane.
5. 1,12 - bis(N - glycidyl-5',5'-dimethylhydantoinyl-3')-dodecane.
6. 1,6 - bis(N - glycidyl-5',5'-dimethylhydantoinyl-3')-hexane.
7. β,β' - Bis(N - glycidyl-5',5'-dimethylhydantoinyl-3')-diethyl ether.
8. 1,4 - bis(N - glycidyl - 5' - n-propylhydantoinyl-3')-butane.
9. 3,3' - tetramethylene - bis(1,3 - diaza-spiro[4,5]decane-1-glycidyl-2,4-dione).

References Cited
UNITED STATES PATENTS
3,391,097   7/1968   Williamson _____ 260—309.5

NATALIE TROUSOF, Primary Examiner

260—2, 18, 47, 78.4, 830, 831, 834

CASE 6234/E

PO-1050
(5/69)

UNITED STATES PATENT OFFICE
CERTIFICATE OF CORRECTION

Patent No. 3,542,803        Dated November 24, 1970

Inventor(s) DANIEL PORRET

It is certified that error appears in the above-identified patent and that said Letters Patent are hereby corrected as shown below:

Column 9, line 25, delete

"[-CH$_2$-CH$_2$-C(=O)-CH$_2$-CH$_2$-]"

Signed and sealed this 1st day of June 1971.

(SEAL)
Attest:

EDWARD M. FLETCHER, JR.
Attesting Officer

WILLIAM E. SCHUYLER, JR.
Commissioner of Patents